(12) United States Patent
Bibeau

(10) Patent No.: US 11,518,021 B1
(45) Date of Patent: Dec. 6, 2022

(54) TEMPLATE FOR ELECTRICAL RECEPTICAL CUTOUT

(71) Applicant: Scott Allen Bibeau, White Bear Lake, MN (US)

(72) Inventor: Scott Allen Bibeau, White Bear Lake, MN (US)

( * ) Notice: Subject to any disclaimer, the term of this patent is extended or adjusted under 35 U.S.C. 154(b) by 464 days.

(21) Appl. No.: 16/744,380

(22) Filed: Jan. 16, 2020

Related U.S. Application Data

(60) Provisional application No. 62/793,598, filed on Jan. 17, 2019.

(51) Int. Cl.
*G01B 3/00* (2006.01)
*B25H 7/04* (2006.01)
*H02G 3/12* (2006.01)
*H02G 3/08* (2006.01)

(52) U.S. Cl.
CPC ............ *B25H 7/04* (2013.01); *G01B 3/002* (2013.01); *H02G 3/12* (2013.01); *H02G 3/086* (2013.01)

(58) Field of Classification Search
CPC . B25H 7/04; G01B 3/002; H02G 3/12; H02G 3/086
See application file for complete search history.

(56) References Cited

U.S. PATENT DOCUMENTS

| | | | | |
|---|---|---|---|---|
| 5,946,809 A * | 9/1999 | Bright | ................ | B26F 1/32 30/361 |
| 7,134,217 B2 * | 11/2006 | Melittas | ................ | B41K 1/06 33/528 |
| 7,210,241 B1 * | 5/2007 | Bree | ................ | B25H 7/04 33/528 |
| 7,367,131 B1 * | 5/2008 | Hordis | ................ | H02G 3/12 324/67 |
| 7,454,844 B1 * | 11/2008 | Ruby | ................ | H02G 1/00 33/528 |
| 7,845,089 B1 * | 12/2010 | Lavalle | ................ | H02G 3/12 33/528 |
| 7,926,195 B2 * | 4/2011 | Crorey | ................ | G01V 3/081 33/528 |
| 8,006,401 B1 * | 8/2011 | Shapiro | ................ | H02G 1/00 33/528 |

(Continued)

OTHER PUBLICATIONS https://web.archive.org/web/20030803053213/http://www.handymark.net/.

(Continued)

*Primary Examiner* — Yaritza Guadalupe-McCall
(74) *Attorney, Agent, or Firm* — Sherrill Law Offices, PLLC

(57) ABSTRACT

A self-supporting template for an electrical receptacle cutout and method of using the template. The template includes a base plate with template openings, an upright on the base plate, a biased reciprocating push button, and at least one sharp. The push button is secured to the upright for transverse reciprocation between a biased first position spaced furthest from the base plate and a second position spaced closest to the base plate. The at least one sharp reciprocates concurrently with the push button wherein the distal tip is fully recessed when the push button is in the first position and protrudes a fully extended distance in the second transverse direction from the lower major surface of the base plate when the push button is in the second position.

17 Claims, 17 Drawing Sheets

(56) References Cited

U.S. PATENT DOCUMENTS

| | | | | |
|---|---|---|---|---|
| 8,099,878 B2 * | 1/2012 | Guzallis | ................... | H02G 1/00 33/528 |
| 8,232,482 B2 * | 7/2012 | Arbel | ....................... | H02G 3/14 174/67 |
| 10,391,665 B2 * | 8/2019 | Osborne | ............... | B26F 1/3846 |

OTHER PUBLICATIONS https://web.archive.org/web/20071121003706/http://www.sandman.com/lvtemplate.html.

https://web.archive.org/web/20131001141636/https://lsdinc.com/set-up-tools/7333/EZ-Cut-.

https://web.archive.org/web/20170403204501/https://www.acmetools.com/shop/tools/calculated-industries-8105.

https://web.archive.org/web/20170307022817/http://meproducts.net/products?subcategory=L09[May 26, 2020 1:11:58 PM].

https://web.archive.org/web/20170520053016/https://quadsaw.com/.

https://web.archive.org/web/20180118161241 /https://magnepull.com/qbit.

https://web.archive.org/web/20200525000226/https://jonard.com/wall-box-template-levels.

\* cited by examiner

TEMPLATE FOR ELECTRICAL RECEPTICAL CUTOUT

BACKGROUND

It is often necessary to cut an opening in drywall to accommodate passage of an electrical receptacle. These cutouts have fairly tight tolerances as an undersized opening obstructs passage of the receptacle through the drywall while an oversized opening can decrease stability of a receptacle when it is secured directly to the drywall, and can leave the perimeter of the opening exposed beyond the edges of a cover plate.

Accordingly, a substantial need exists for an inexpensive tool that facilitates quick and precise marking of an electrical receptacle cutout on drywall.

SUMMARY OF THE INVENTION

A first aspect of the invention is a self-supporting template for an electrical receptacle cutout. The template includes a base plate, an upright on the base plate, a biased reciprocating push button, and at least one sharp. The base plate has transversely spaced upper and lower major surfaces with template openings extending transversely through the base plate configured and arranged for marking the corners of an electrical receptacle cutout. The upright extends in an upward first transverse direction from the upper major surface of the base plate. The push button is secured to the upright for transverse reciprocation between a first position spaced furthest from the base plate and a second position spaced closest to the base plate. A biasing means biases the push button towards the first position. The at least one sharp has a head end, a shaft, and a distal tip pointing in a second transverse direction opposite the first transverse direction. The at least one sharp is configured and arranged for transverse reciprocation concurrently with transverse reciprocation of the push button wherein the distal tip is fully recessed in the first transverse direction from the lower major surface of the base plate when the push button is in the first position and protrudes a fully extended distance in the second transverse direction from the lower major surface of the base plate when the push button is in the second position.

In a preferred embodiment the template includes at least a pair of longitudinally or laterally spaced sharps for preventing rotation of the template around a single sharp.

A second aspect of the invention is a method of marking cut-lines for an electrical receptacle cutout on an exposed surface of a wall using a template in accordance with the first aspect of the invention. The method includes the sequential steps of (i) obtaining and hand gripping a self-supporting template for an electrical receptacle cutout in accordance with the first aspect of the invention; (ii) positioning the template against the exposed surface of the wall with the lower major surface of the base plate of the template pressed against the exposed surface of the wall with the template openings aligned with corners of a desired electrical receptacle cutout in the wall; (iii) depressing, typically by striking, the push button on the template to force repositioning of the push button from the first position into the second position and thereby drive the at least one sharp into the wall; (iv) marking the wall through the template openings so as to provide indicia on the wall designating cut-lines for an electrical receptacle cutout; and then (v) pulling the template away from the wall so as to withdraw the at least one sharp from the wall and reveal the indicia designating the cut-lines for an electrical receptacle cutout.

The method preferably includes the additional steps of (A) releasing the hand grip on the template between steps (iii) and (iv) whereby the at least one sharp retains the template in position on the wall during marking, and/or (B) cutting the wall along the cut-out lines to create an opening in the wall, and installing an electrical receptacle in the wall through the opening in the wall.

DETAILED DESCRIPTION OF A PREFERRED EMBODIMENT
Nomenclature Table

| REF. No. | DESCRIPTION |
| --- | --- |
| 100 | Template or Tool for Electrical Receptacle Cutout |
| 120 | Base Plate |
| 120a | Top Edge of Base Plate |

DETAILED DESCRIPTION OF A PREFERRED EMBODIMENT
Nomenclature Table

| REF. No. | DESCRIPTION |
| --- | --- |
| 120b | Bottom Edge of Base Plate |
| 120s | Sides of Base Plate |
| $120_{up}$ | Upper Major Surface of Base Plate |
| $120_{low}$ | Lower Major Surface of Base Plate |
| 121 | Corner Posts |
| 122 | Upright |
| 127 | Sharp Passage Holes in Upright |
| 128 | Snap Post Openings in Upright |
| 129 | Template Opening in Base Plate |
| 129x | Longitudinal Leg of Template Openings |
| 129y | Lateral Leg of Template Openings |
| 130 | Bubble Levels |
| 130x | x-axis Bubble Level |
| 130y | y-axis Bubble Level |
| 140 | Center Plate |
| 142 | Snap Posts on Center Plate |
| 147 | Sharp Passage Holes in Upright |
| 150 | Push Button |
| 155 | Beveled Catches on the Push Button |
| 160 | Sharps (Nails) |
| 161 | Head of Sharp |
| 162 | Shaft of Sharp |
| 163 | Distal Tip of Sharp |
| 170 | Biasing Mechanism (Springs) |
| 190 | Centering Viewing Window |
| x | Longitudinal x-axis |
| y | Lateral y-axis |
| z | Transverse z-axis |
| z1 | First Transverse Direction |
| z2 | Second Transverse Direction |
| H | Hand |
| P | Writing Utensil (Pencil) |
| W | Drywall Wall |

DETAILED DESCRIPTION OF THE INVENTION INCLUDING A PREFERRED EMBODIMENT

Construction

The tool 100 is a template for marking an opening to be cut in drywall W to accommodate passage of an electrical receptacle.

Figure 1:
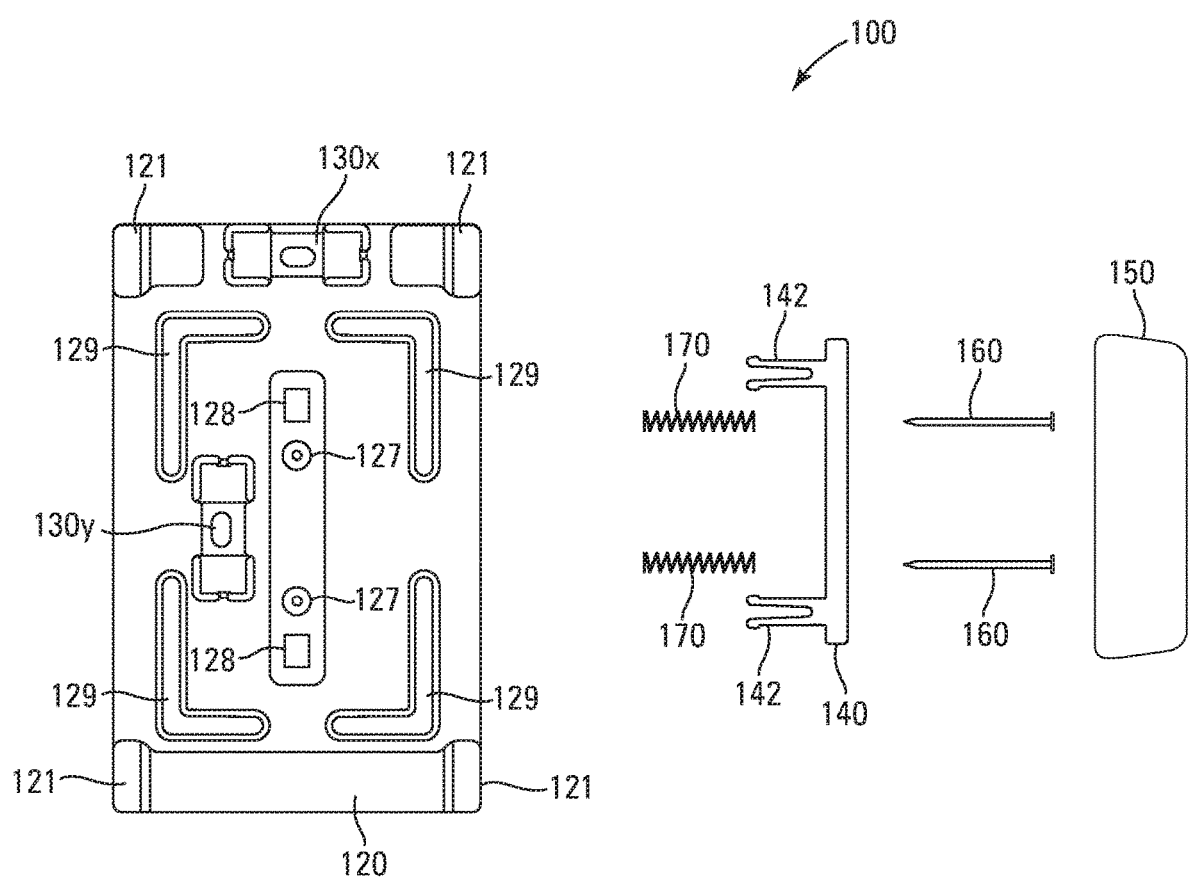
FIG. 1 is an exploded view of one embodiment of the invention.
Figure 2:
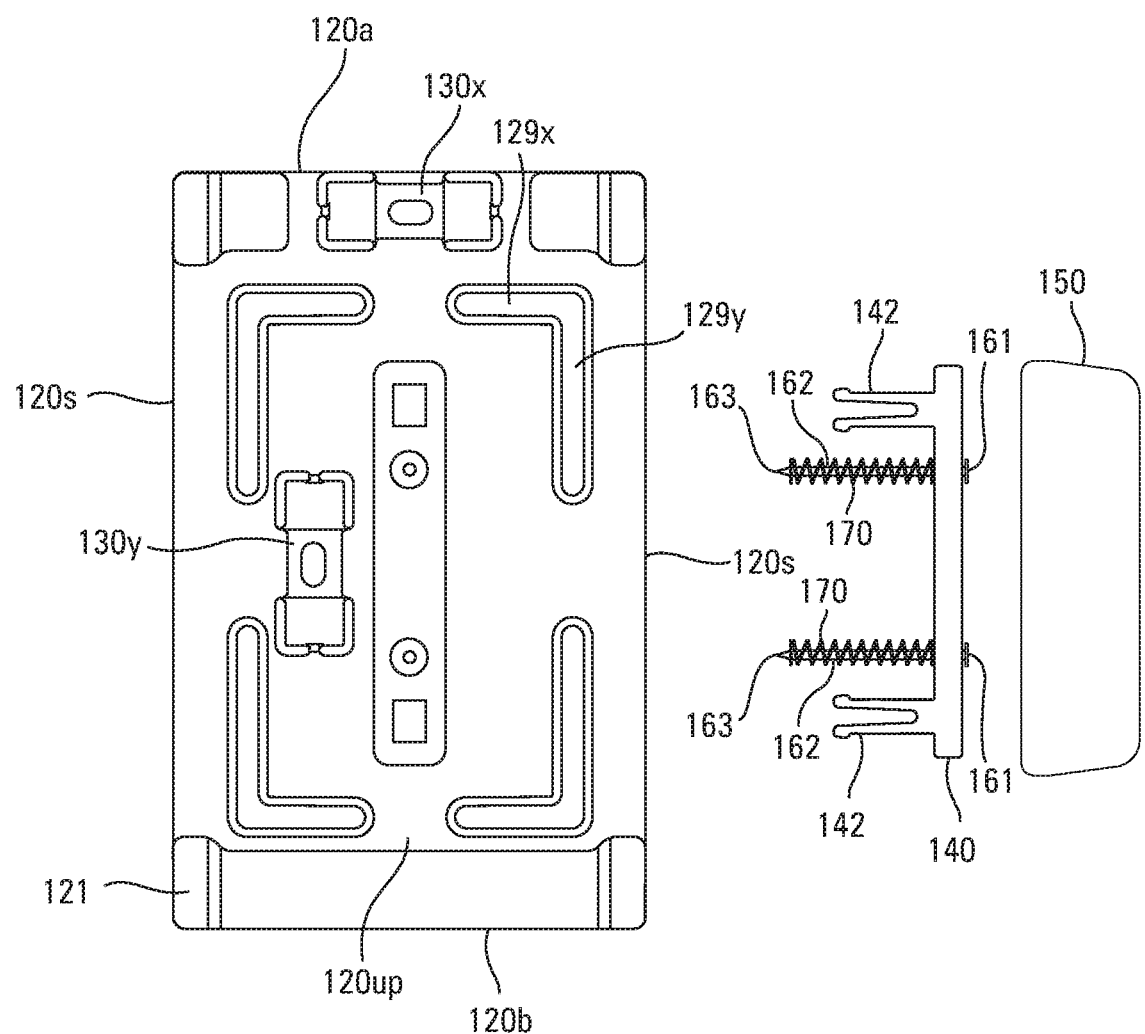
FIG. 2 is a partially assembled view of the invention depicted in FIG. 1.

Referring generally to FIGS. 1 and 2, the tool 100 includes a base plate 120, an upright 122 on the base plate 120, a biased reciprocating push button 150, and at least one sharp 160.

Referring generally to FIGS. 1, 2, 5 and 10, the base plate 120 has longitudinally x spaced top and bottom edges 120a and 120b respectively, laterally y spaced sides 120s, and transversely z spaced upper and lower major surfaces $120_{up}$ and $120_{low}$ respectively.

The base plate 120 should have a longitudinal length x and a lateral width y appropriate for providing a cutout template for the various sizes of common electrical receptacles. A base plate 120 having a longitudinal length x of between about 4.5 to 6 inches and a lateral width y of between about 2.5 to 6 inches will accommodate templates for the majority of common plastic and metal residential and commercial electrical receptacles.

The base plate 120, can be constructed from any material possessing sufficient structural integrity including paperboard and cardboard for inexpensive disposable models, and plastic and metal for more robust models.

Figure 16:
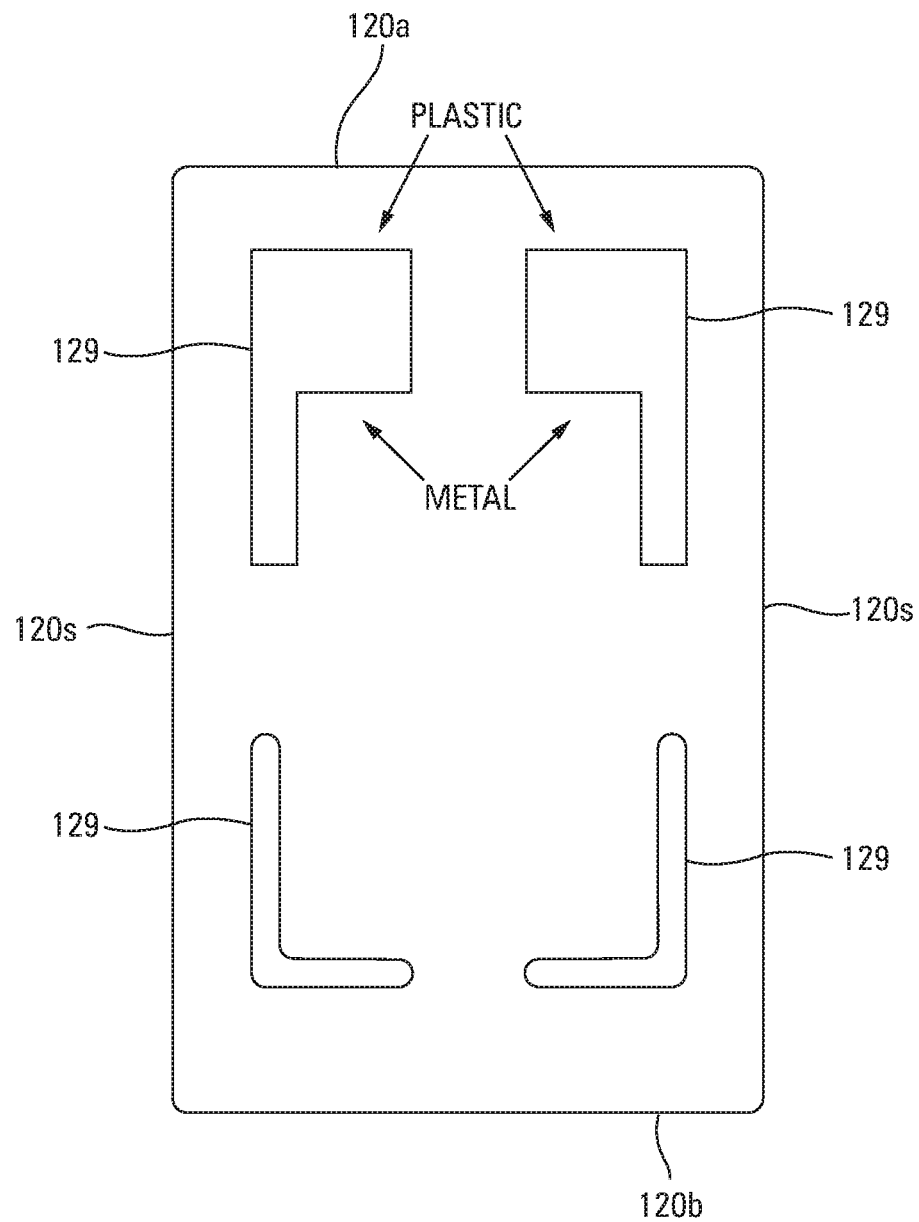
FIG. 16 depicts an alternative template for the invention, in which tracing against an inner wall of the template openings sizes the opening for a smaller metal electrical receptacle and tracing against an outer wall of the template openings sizes the opening for a larger plastic electrical receptacle.
Figure 17:
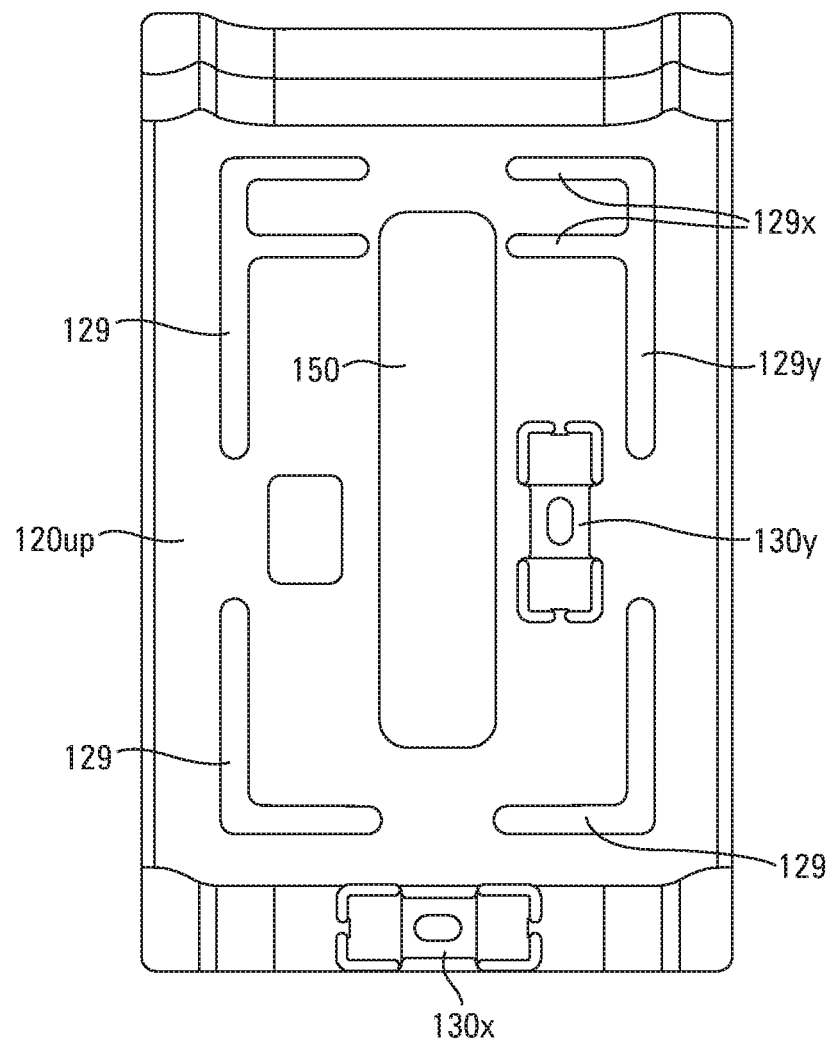
FIG. 17 depicts a further alternative template for the invention, in which two of the template openings are provided with two different longitudinally x spaced lateral y legs with one lateral y leg sized for a smaller electrical receptacle and the other lateral y leg sized for a larger electrical receptacle.

Referring generally to FIGS. 1, 2, 5 and 10, template openings 129 extend transversely z through the base plate 120 for marking the corners of an electrical receptacle cutout. A preferred configuration for the template openings 129 is an L-shaped configuration with a longitudinal leg 129x and a lateral leg 129y. Referring generally to FIGS. 16 and 17, template openings 129 for differently sized electrical receptacles (e.g., one for 3 inch by 2 inch metal boxes and one for 3.5 inch by 2 inch plastic boxes) can be provided in the base plate 120.

Referring generally to FIGS. 1, 2, 5, 6, 7, 8 and 9, the upright 122 extends in an upward first transverse z1 direction from the upper major surface $120_{up}$ of the base plate 120. The upright 122 can be constructed from the same materials as the base plate 120.

Figure 6:
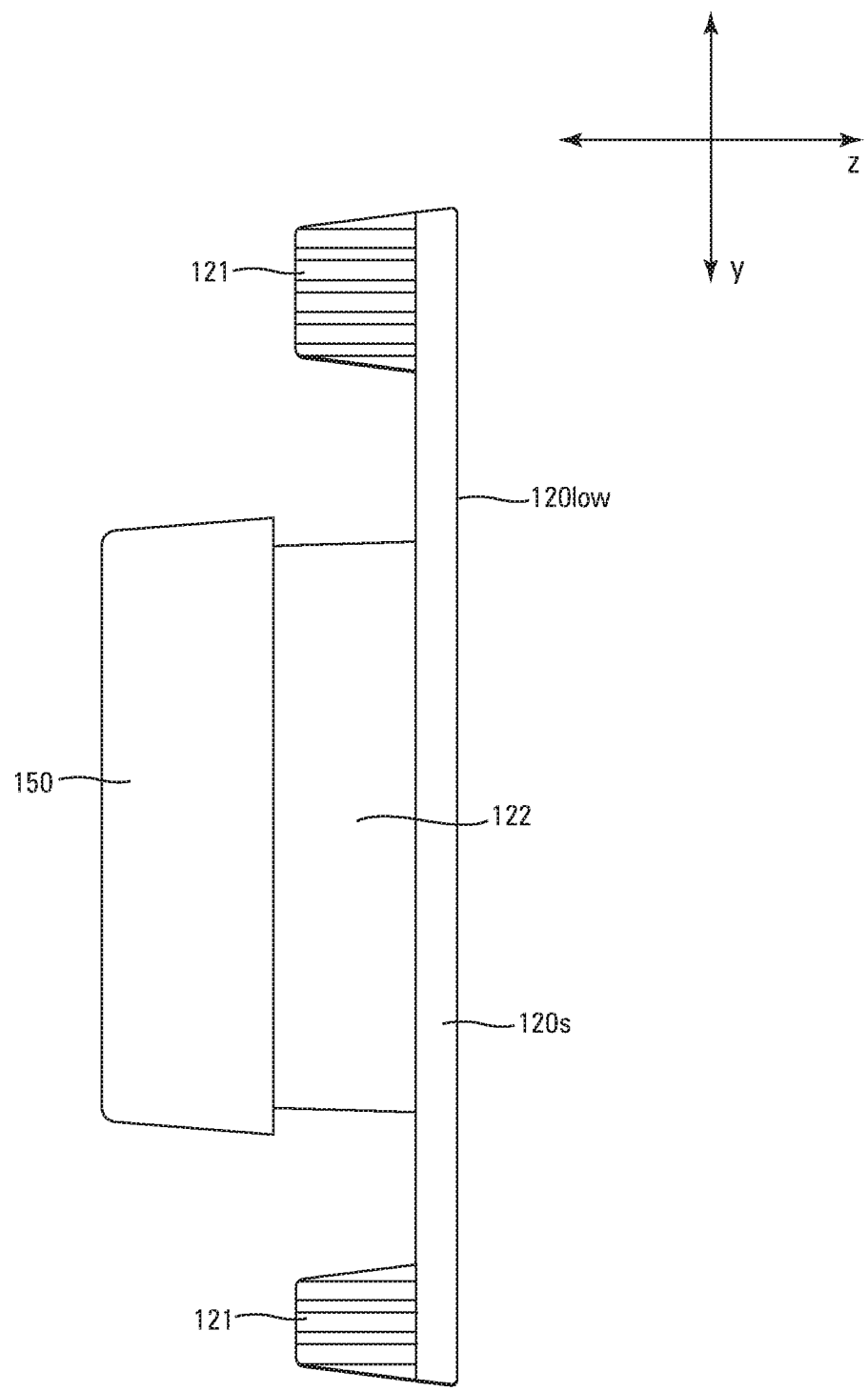
FIG. 6 is a right side view of the invention depicted in FIG. 5.
Figure 7:
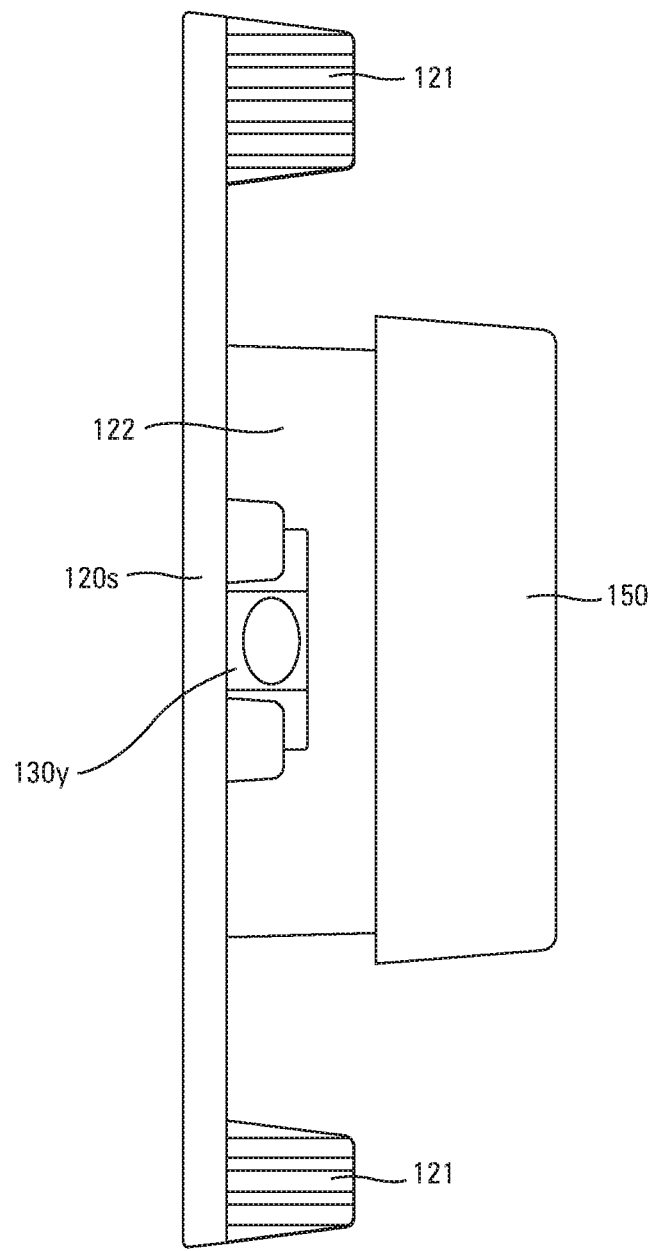
FIG. 7 is a left side view of the invention depicted in FIG. 5.
Figure 8:
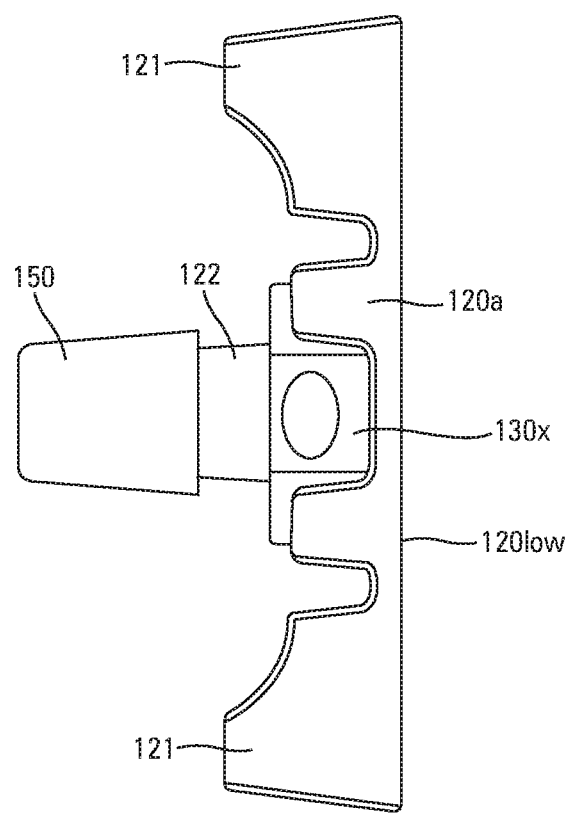
FIG. 8 is a top view of the invention depicted in FIG. 5.
Figure 9:
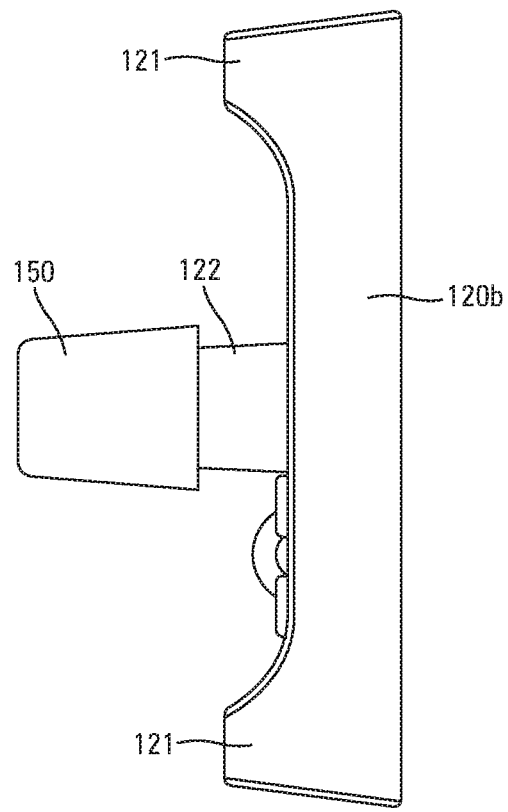
FIG. 9 is a bottom view of the invention depicted in FIG. 5.
Figure 10:
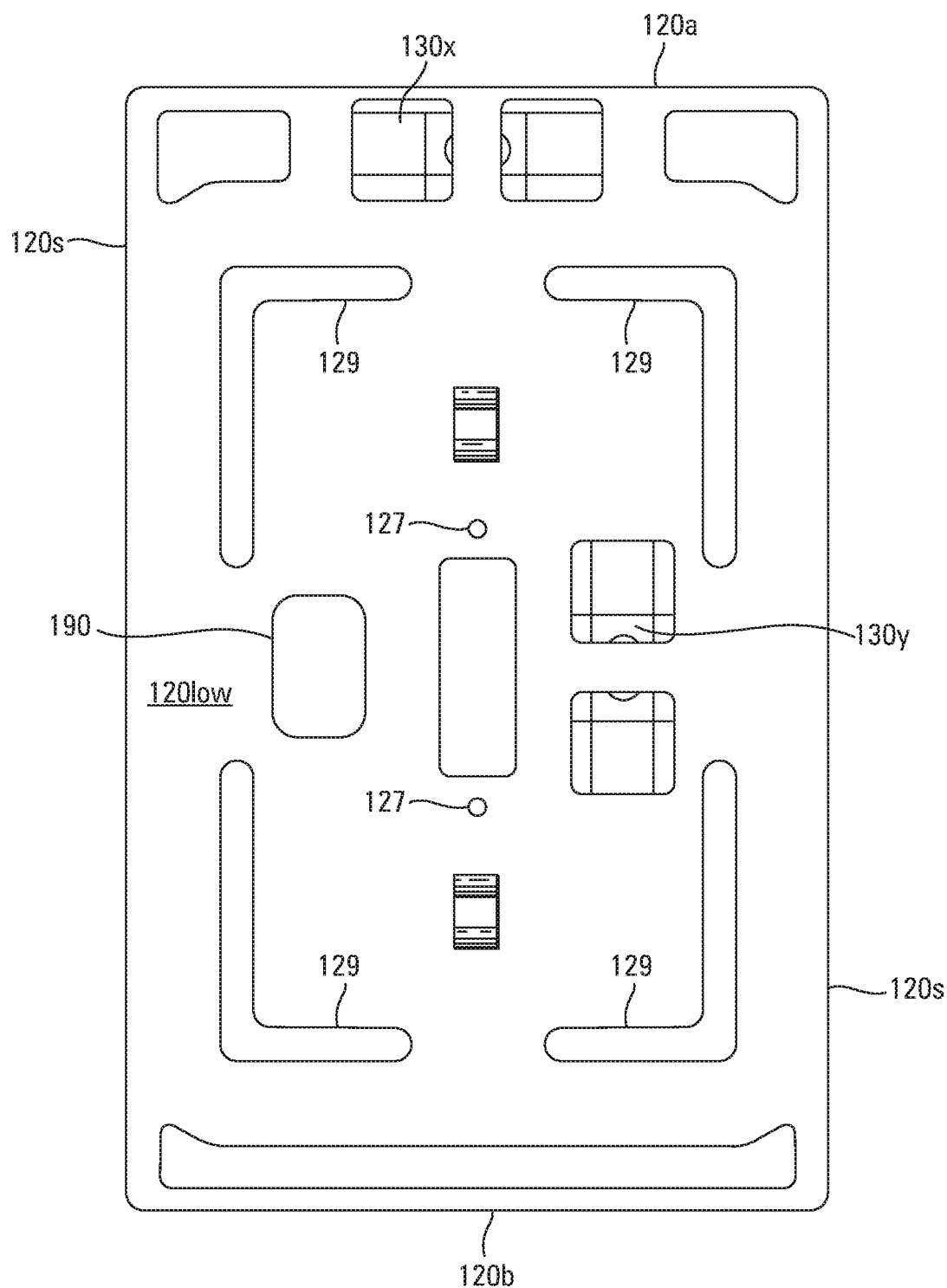
FIG. 10 is a back view of the invention depicted in FIG. 5.
Figure 11:
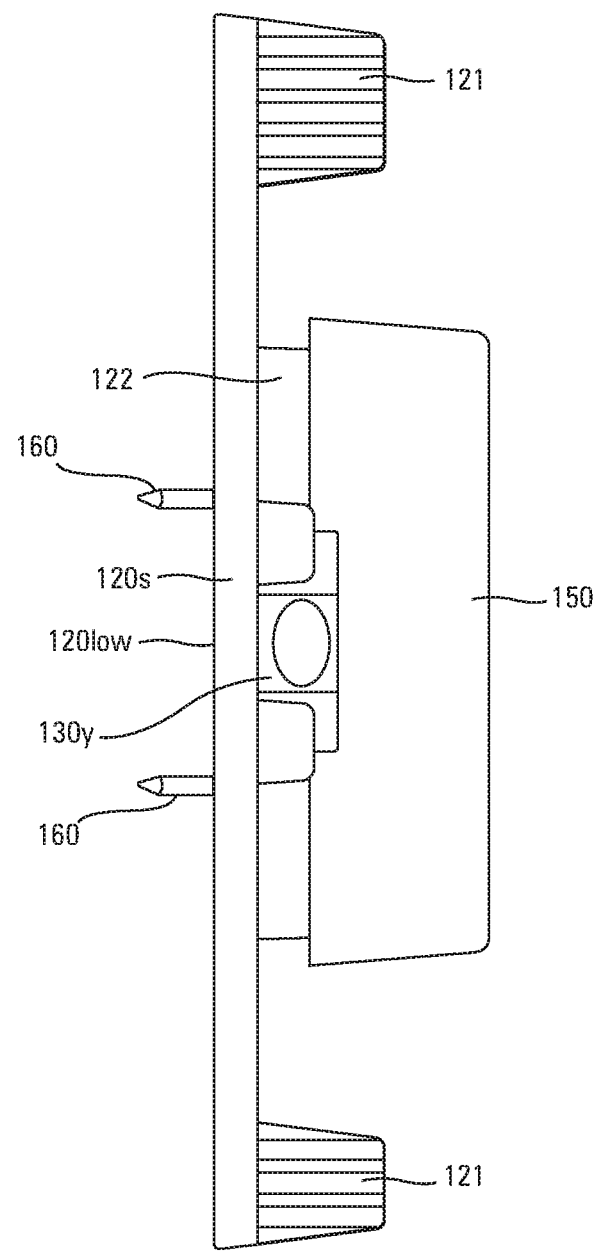
FIG. 11 is a left side view of the invention depicted in FIG. 5 with the push bar depressed against the bias and the sharps extended into mounting position.
Figure 12:
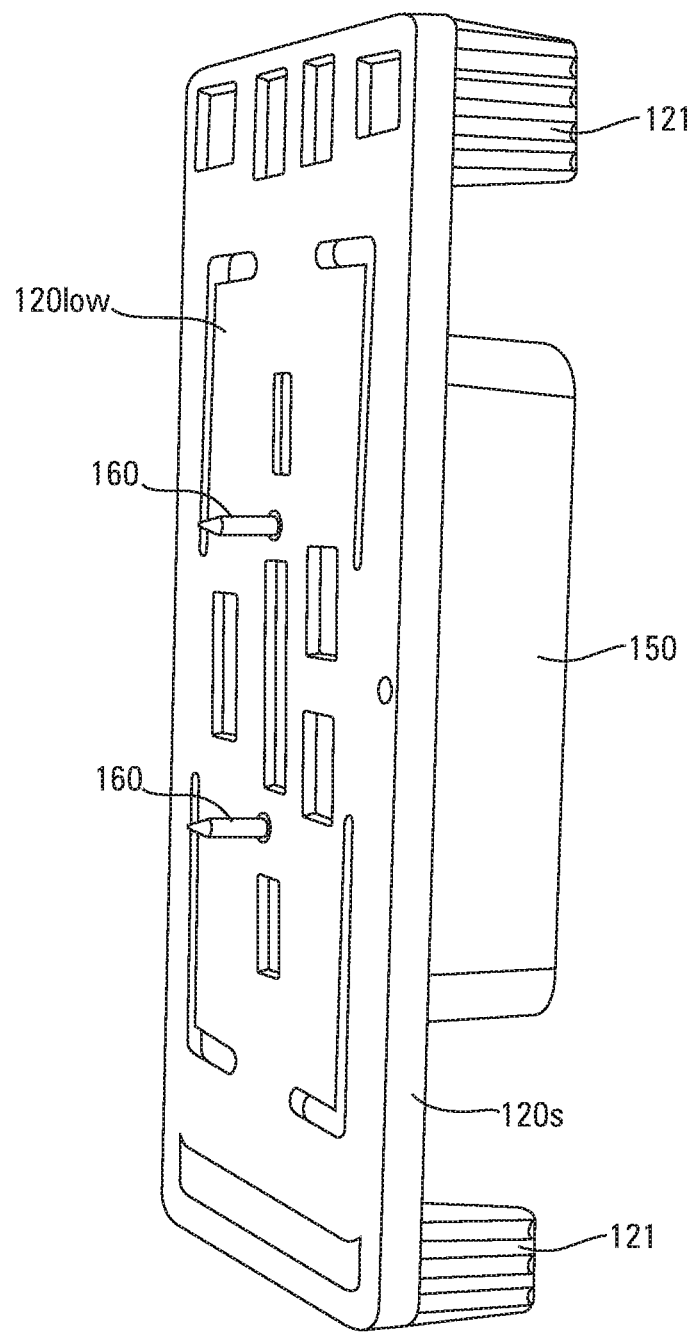
FIG. 12 is a back side perspective view of the invention as depicted in FIG. 11.

Referring generally to FIGS. 6 and 11, the push button 150 is secured to the upright 122 for transverse z reciprocation between a first position spaced furthest from the base plate 120 and a second position spaced closest to the base plate 120. The push button 150 can be constructed from the same materials as the base plate 120 but must possess sufficient structural integrity to withstand repeated striking of the push button 150 to reciprocate the button 150 between the first and second transverse z positions. The push button 150 is preferably sized, configured and arranged to facilitate comfortable striking of the push button 150 with the palm of an open hand H or the heel of a closed fist.

Referring generally to FIGS. 1 and 2, the push button 150 is biasing by any suitable biasing means 170 towards the first position. Suitable biasing means 170 include compression springs, expansion springs, leaf springs, elastic bands, etc.

Referring generally to FIGS. 1 and 2, the at least one sharp 160 has a head end 161, a shaft 162 and a distal tip 163 pointing in a second transverse direction z2 opposite the first transverse direction z1. The at least one sharp 160 is configured and arranged for transverse z reciprocation concurrently with transverse z reciprocation of the push button 150 wherein the distal tip 163 is fully recessed in the first transverse direction z1 from the lower major surface $120_{low}$ of the base plate 120 when the push button 150 is in the first position and protrudes a fully extended distance in the second transverse direction z2 from the lower major surface $120_{low}$ of the base plate 120 when the push button 150 is in the second position. In a preferred embodiment, the distal tip 163 of the at least one sharp 160 protrude a distance between 0.2 and 0.5 inches beyond the lower major surface $120_{low}$ of the base plate 120 in the second transverse direction z2 when the push button 150 is in the second position.

Referring generally to FIGS. 1 and 2, a preferred embodiment of the tool 100 includes (i) a base plate 120 with template openings 129, (ii) an upright 122 with a pair of sharp passage holes 127, (iii) an optional center viewing window 190 therethrough to facilitate location of any marking indicating the center of the desired electrical receptacle cutout made on the wall W prior to use of the tool 100, (iv) optional longitudinal x axis and/or lateral y axis bubble levels 130x and 130y respectively, for leveling the tool upon a wall W when the tool 100 is oriented with either the longitudinal x axis or the lateral y axis of the tool 100 running horizontal, (v) a center plate 140 with snap posts 142 and sharp passage holes 147, (vi) a push button 150, (vii) a pair of sharps 160, and (viii) a pair of compression springs 170.

Figure 3:
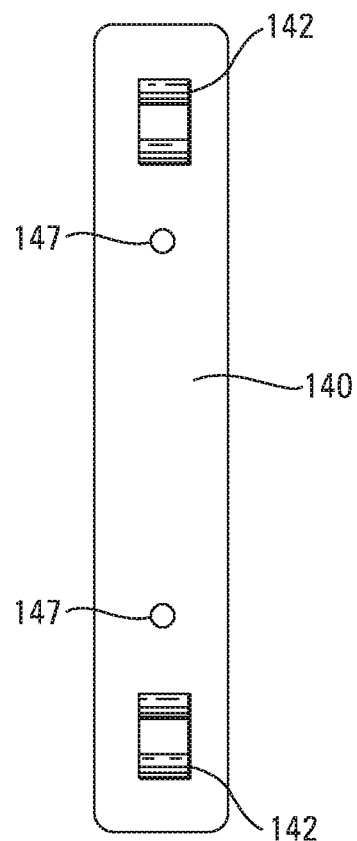
FIG. 3 is an enlarged bottom view of the center plate depicted in FIG. 1.
Figure 4:
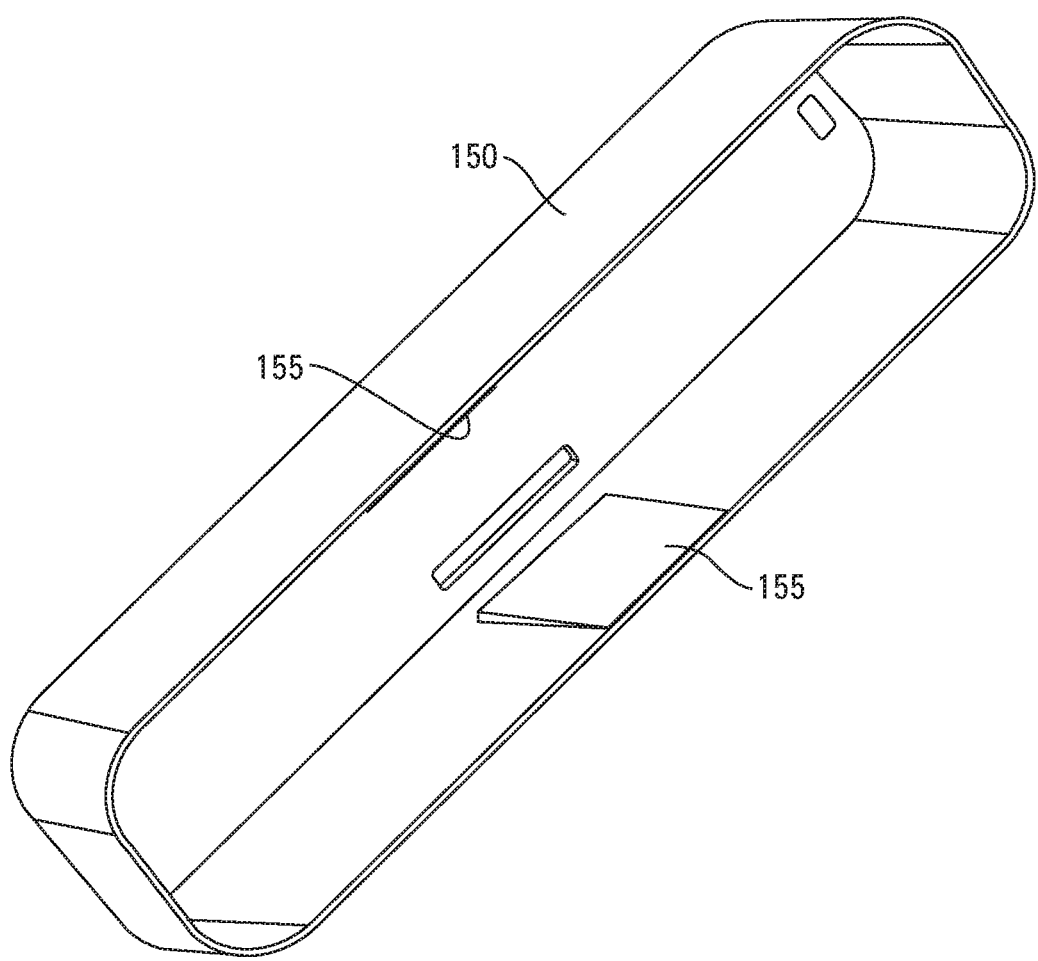
FIG. 4 is an enlarged bottom perspective view of the push button depicted in FIG. 1.
Figure 5:
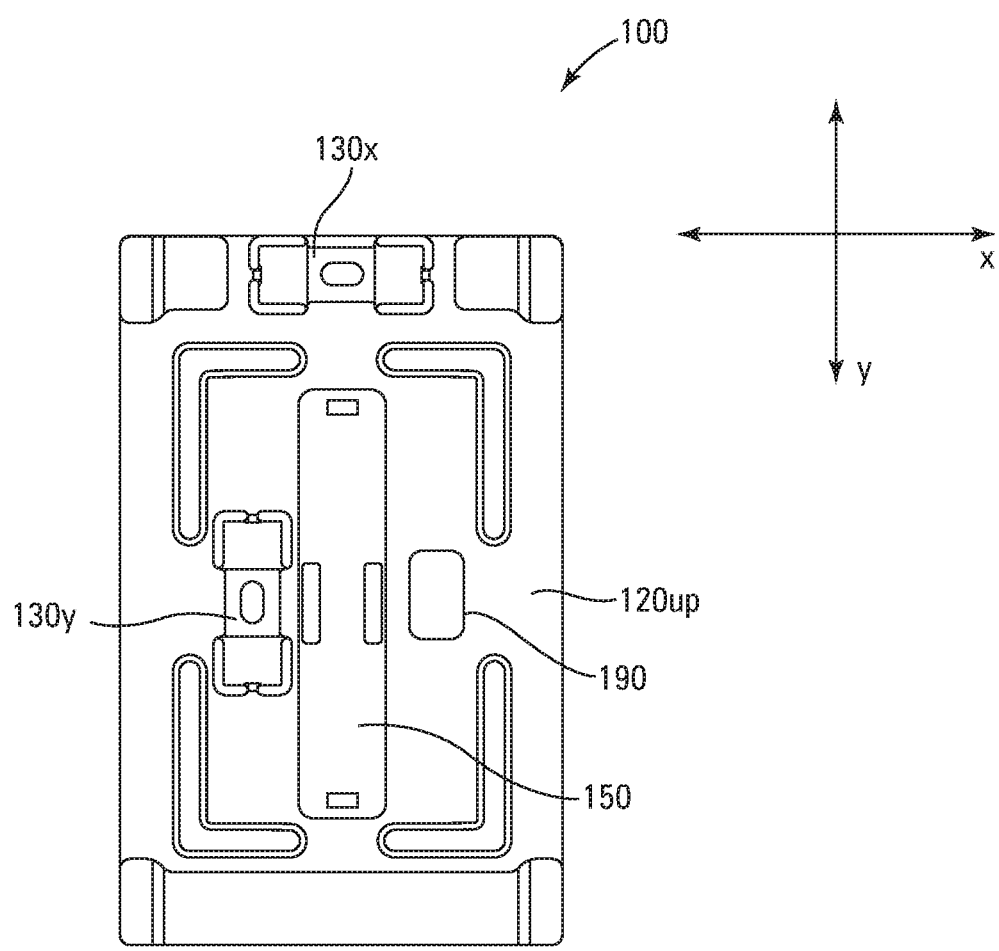
FIG. 5 is a fully assembled front view of the invention depicted in FIG. 1 with an optional centering viewing window and the sharps in the biased recessed safety position.

Referring generally to FIG. 3, the sharp passage holes 147 in the center plate 140 are sized to allow passage of the shafts 162 of the sharps 160 but not the heads 161 of the sharps 160. Referring generally to FIGS. 1, 2, 3 and 4, the center plate 140 is snap fit into the push button 150 where it is captured by beveled catches 155 on the interior of the push button 150, with the heads 161 of the sharps 160 trapped between the center plate 140 and the push button 150 with the snap posts 142 and the shafts 162 of the sharps 160 extending in the same direction from the push button 150.

Referring generally to FIG. 2, the compression springs 170 are positioned on the shafts 162 of the sharps 160 and the combination of center plate 140 and push button 150 nested onto the center upright 122 of the base plate 120 with the snap posts 142 passing through snap post openings 128 in the upright 122 so as to limit upward movement of the combination of center plate 140 and push button 150 relative to the base plate 120, and the sharps 160 aligned with and extending into the sharp passage holes 127 in the upright 122. This construction biases the sharps 160 into a first stowage position with the distal tips 163 recessed within the upright 122, and upon striking of the push button 150 against the bias moves the sharps 160 into a mounting position with the distal tips 163 extending past the lower major surface $120_{low}$ of the base plate 120 for penetration into drywall W.

The compression springs 170 should have a spring constant effective for biasing the sharps 160 into the first stowage position but insufficient to bias the sharps 160 back into the stowage position once they have been extended and penetrated into drywall W. In other words, the spring(s) 170 should exert a cumulative biasing force when the sharp(s) 160 protrude the fully extended distance into drywall W, that is insufficient to overcome the cumulative resistance of the sharp(s) 160 to withdrawal from ½ inch thick drywall W when the sharp(s) 160 protrude the fully extended distance into the drywall. This prevents the tool 100 from spontaneously detaching from a wall W once the sharps 160 have been driven into the drywall.

Referring generally to FIGS. 6, 7, 11, 12, 13 and 14, at least two longitudinally x or laterally y spaced posts 121 can be provided on the template 100 to facilitate one-handed gripping of the template 100 with the gripping hand H positioned away from the lower major surface $120_{low}$ of the based plate 120. The posts 121, such as two or four corner posts 121, extend in the first transverse direction z1 from the upper major surface $120_{up}$ of the base plate 120 and are spaced to accommodate pinched retention of two posts 121 between the thumb and a finger on one hand H.

Method of Using

Figure 13:
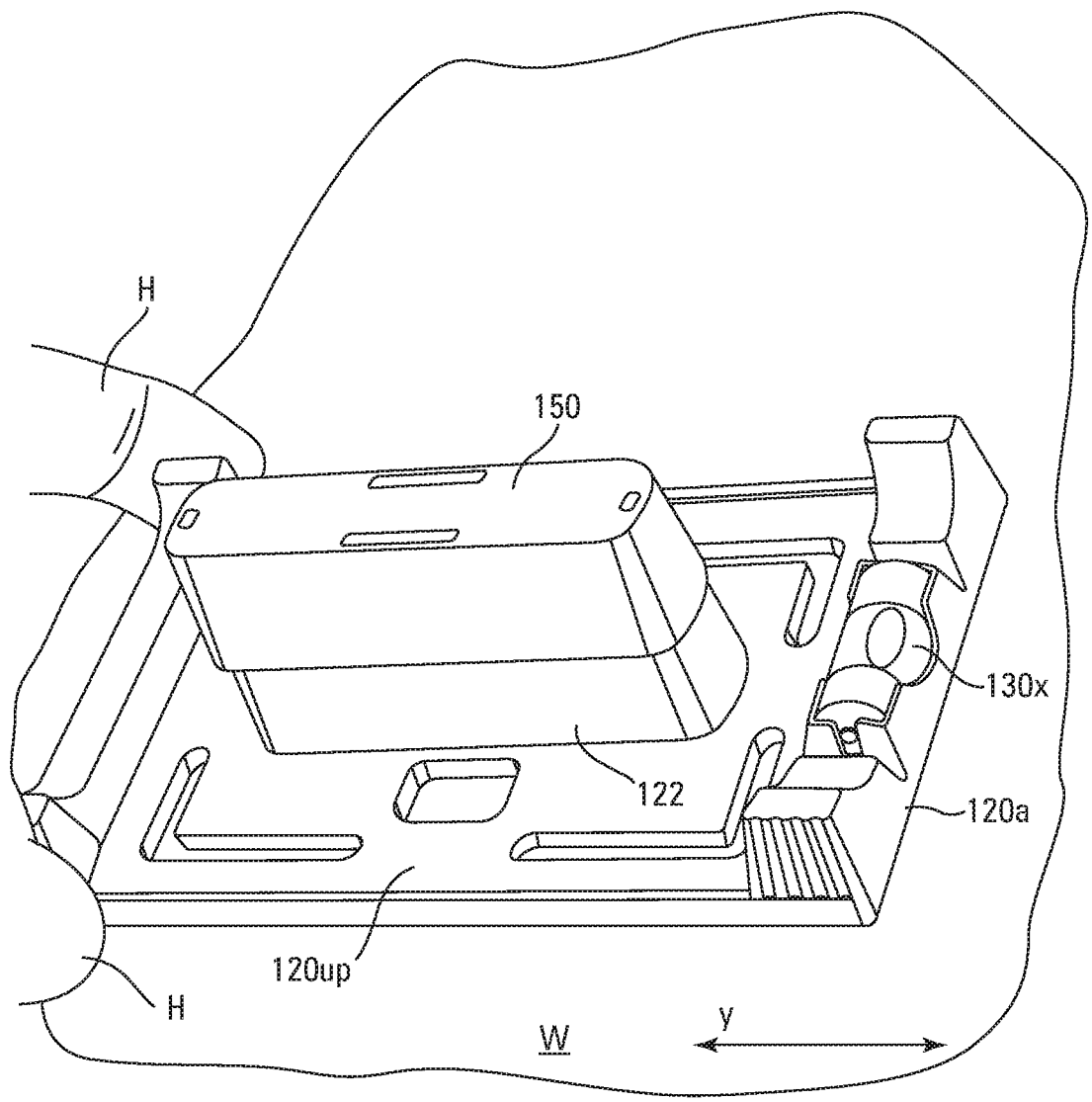
FIG. 13 is front perspective view of the invention as depicted in FIG. 5 placed against a drywall wall.
Figure 14:
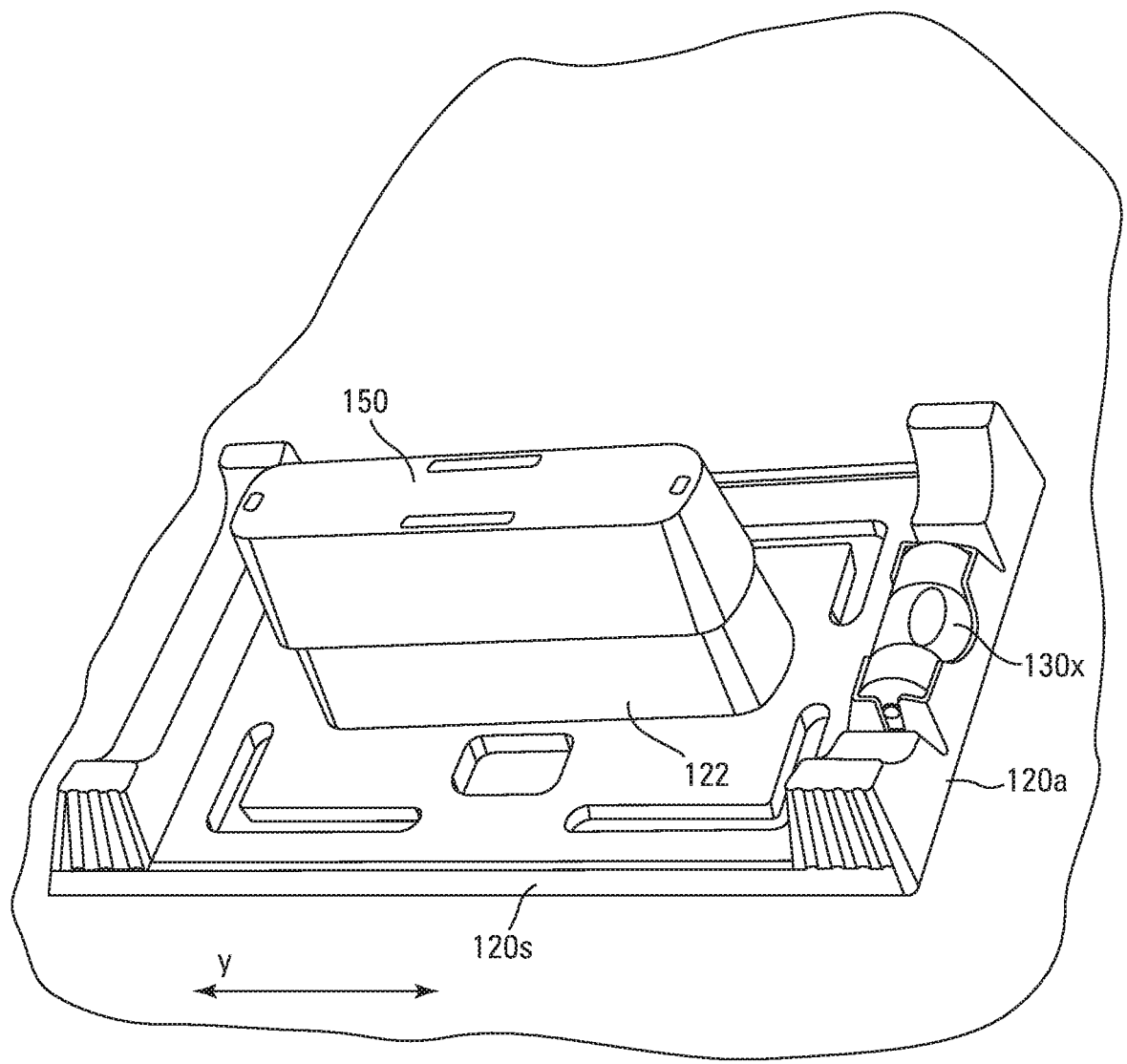
FIG. 14 is front perspective view of the invention as depicted in FIG. 13 mounted to the drywall by depressing the push bar towards the drywall and thereby driving the sharps into the drywall wall.
Figure 15:
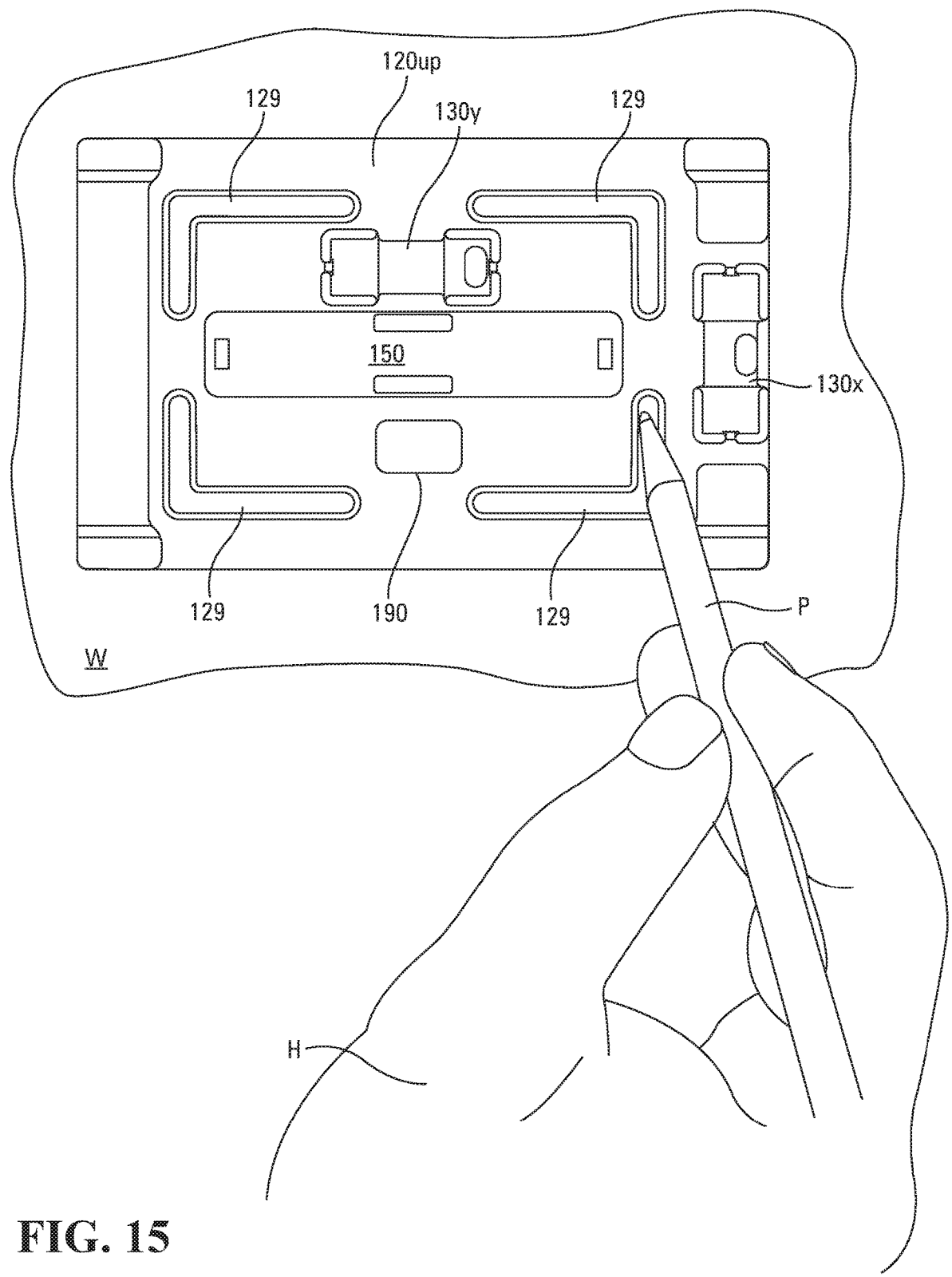
FIG. 15 depicts the process of marking an electrical receptacle cutout on drywall using the invention as depicted in FIG. 14.

Referring generally to FIGS. 13, 14 and 15, the tool 100 can be used to mark cut-lines for an electrical receptacle cutout on an exposed surface of a wall W, including vertical walls, horizontal ledges, horizontal ceilings, slanted ceilings, etc. by sequentially (i) obtaining and hand gripping a self-supporting template 100 in accordance with the invention, (ii) positioning the template 100 against the exposed surface of the wall W with the lower major surface $120_{low}$ of the base plate 120 of the template 100 pressed against the exposed surface of the wall W with the template openings 129 aligned with corners of a desired electrical receptacle cutout in the wall W, (iii) depressing the push button 150 on the template 100 to force repositioning of the push button 150 from the first position into the second position against the bias and with sufficient force to drive the at least one sharp 160 into the wall W, (iv) marking the wall W through the template openings 129 so as to provide indicia on the wall W designating cut-lines for an electrical receptacle cutout, and (v) pulling the template 100 away from the wall W so as to withdraw the at least one sharp 160 from the wall W and reveal the indicia designating the cut-lines for an electrical receptacle cutout.

A user can let go of the template 100 after the at least one sharp 160 has been driven into the wall W as the at least one sharp 160 will retain the template 100 in position on the wall W during marking.

After the template 100 is pulled away from the wall W, the wall W may be cut with a suitable tool such as a drywall saw along the cut-out lines to create an opening in the wall W, and then an electrical receptacle installed in the wall W through the opening in the wall W.

A preferred method of depressing the push button 150 is to strike the push button 150 with the heel of an open hand H or closed first H.

Referring generally to FIG. 13, when the template 100 is equipped with posts 121, the template 100 can be conveniently hand griped with a single hand H by pinching two of the posts 121 between a thumb and a finger. This provides a sturdy grip on the template 100 without requiring any portion of the hand H to project in the second transverse direction z2 past the lower major surface $120_{low}$ of the base plate 120 of the template 100.

I claim:

1. A self-supporting template for an electrical receptacle cutout, comprising:
    (a) a base plate having transversely spaced upper and lower major surfaces, and template openings extending transversely through the base plate configured and arranged for marking the corners of an electrical receptacle cutout,
    (b) an upright extending in an upward first transverse direction from the upper major surface,
    (c) a push button secured to the upright for transverse reciprocation between a first position spaced furthest from the base plate and a second position spaced closest to the base plate,
    (d) a biasing means for biasing the push button towards the first position, and
    (e) at least one sharp having a head end, a shaft and a distal tip pointing in a second transverse direction opposite the first transverse direction, the sharp configured and arranged for transverse reciprocation concurrently with transverse reciprocation of the push button wherein the distal tip is fully recessed in the first transverse direction from the lower major surface of the base plate when the push button is in the first position and protrudes a fully extended distance in the second transverse direction from the lower major surface of the base plate when the push button is in the second position,
    (f) wherein the at least one sharp has a cumulative withdrawal resistance in ½ inch thick drywall when protruding a fully extended distance into the drywall and the biasing means exerts a cumulative biasing force when the at least one sharp protrudes a fully extended distance which is insufficient to overcome the withdrawal resistance.

2. The self-supporting template of claim 1 wherein the at least one sharp comprises at least a pair of longitudinally or laterally spaced sharps, the pair of sharps have a cumulative withdrawal resistance in ½ inch thick drywall when protruding a fully extended distance into the drywall, and the springs have spring constants insufficient to overcome the withdrawal resistance when the sharps protrude a fully extended distance into the drywall.

3. The self-supporting template of claim 2 wherein the base plate has a longitudinal length of between about 4.5 and 6 inches and a lateral width of between about 2.5 and 6 inches.

4. The self-supporting template of claim 2 wherein the biasing means is an individual compression spring around the shaft of each sharp.

5. The self-supporting template of claim 2 wherein the distal tips of the pair of sharps protrude a distance between 0.2 and 0.5 inches beyond the lower major surface of the base plate in the second transverse direction when the push button is in the second position.

6. The self-supporting template of claim 2 further comprising posts projecting from proximate opposite sides of the base plate in an upward first transverse direction for facilitating two-fingered pinched retention of the template.

7. The self-supporting template of claim 2 further comprising corner posts projecting from each lateral and longitudinal corner of the base plate in an upward first transverse direction for facilitating two-fingered pinched retention of the template.

8. The self-supporting template of claim 2 further comprising a longitudinal bubble level and a lateral bubble level.

9. The self-supporting template of claim 2 having template openings configured and arranged for marking the corners of two differently sized electrical receptacle cutouts.

10. The self-supporting template of claim 1 wherein each template opening is L-shaped, with a longitudinal leg between about 0.5 and 2 inches long and a lateral leg between about 0.5 and 2 inches long.

11. The self-supporting template of claim 1 wherein the biasing means is at least one spring.

12. A method of marking cut-lines for an electrical receptacle cutout on an exposed surface of a wall, comprising the sequential steps of:
   (a) obtaining and hand gripping a self-supporting template for an electrical receptacle cutout in accordance with claim 1,
   (b) positioning the template against the exposed surface of the wall with the lower major surface of the base plate of the template pressed against the exposed surface of the wall with the template openings aligned with corners of a desired electrical receptacle cutout in the wall,
   (c) depressing the push button on the template to force repositioning of the push button from the first position into the second position and thereby drive the at least one sharp into the wall,
   (d) marking the wall through the template openings so as to provide indicia on the wall designating cut-lines for an electrical receptacle cutout, and
   (e) pulling the template away from the wall so as to withdraw the at least one sharp from the wall and reveal the indicia designating the cut-lines for an electrical receptacle cutout.

13. A method of claim 12 further comprising the step of releasing the hand grip on the template between steps (c) and (d) whereby the at least one sharp retains the template in position on the wall during marking.

14. A method of claim 12 further comprising the steps of (i) cutting the wall along the cut-out lines to create an opening in the wall, and (ii) installing an electrical receptacle in the wall through the opening in the wall.

15. A method of claim 12 wherein the wall is a drywall covered vertical wall.

16. A method of claim 12 wherein the step of depressing the push button comprises hand striking of the push button.

17. A method of marking cut-lines for an electrical receptacle cutout on an exposed surface of a wall, comprising the sequential steps of:
   (a) obtaining a self-supporting template for an electrical receptacle cutout in accordance with claim 6,
   (b) pinching the posts between a thumb and a finger so as to grasp the template with a single hand without any portion of the hand projecting in the second transverse direction past the lower major surface of the base plate of the template,
   (c) positioning the template against the exposed surface of the wall with the lower major surface of the base of the template pressed against the exposed surface of the wall with the template openings aligned with corners of a desired electrical receptacle cutout in the wall,
   (d) applying force to the push button on the template for repositioning the push button from the first position into the second position and thereby drive the sharps into the wall,
   (e) marking the wall through the template openings so as to provide indicia on the wall designating cut-lines for an electrical receptacle cutout, and
   (f) pulling the template away from the wall so as to withdraw the sharps from the wall and reveal the indicia designating the cut-lines for an electrical receptacle cutout.

* * * * *